Figure 1:
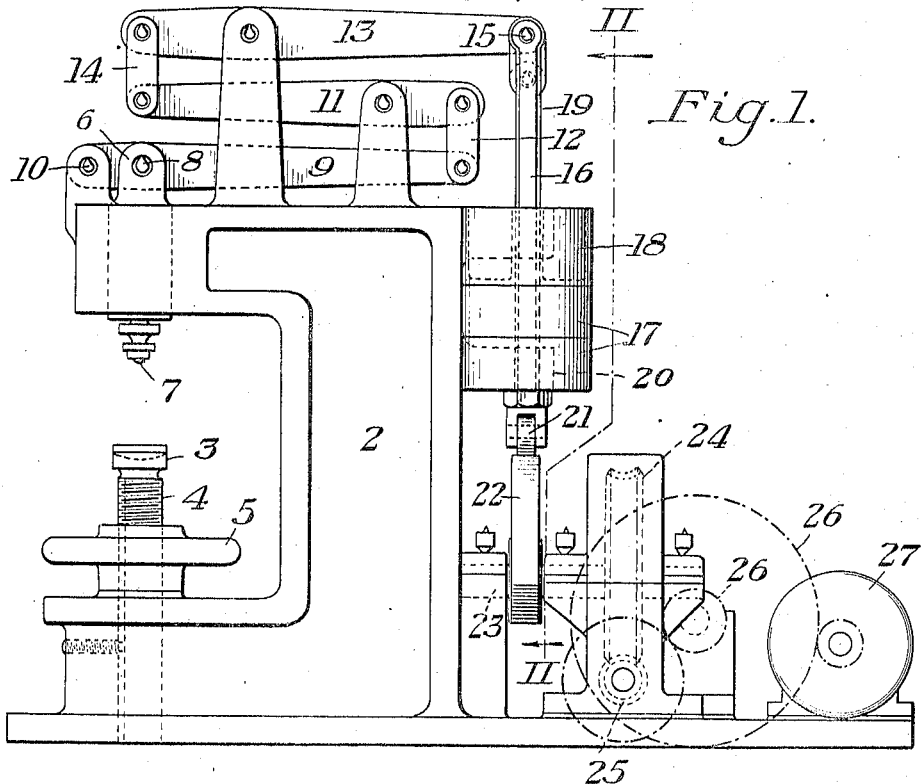

Oct. 18, 1927.

H. M. GERMAN 1,646,195

HARDNESS TESTING MACHINE AND METHOD OF TESTING HARDNESS

Filed May 29, 1926

INVENTOR

Howard M. German,

Patented Oct. 18, 1927.

1,646,195

UNITED STATES PATENT OFFICE.

HOWARD M. GERMAN, OF CRAFTON, PENNSYLVANIA.

HARDNESS-TESTING MACHINE AND METHOD OF TESTING HARDNESS.

Application filed May 29, 1926. Serial No. 112,570.

At the present time it is customary to test metals for hardness in accordance with three recognized methods. These methods are ordinarily referred to as the Brinell, Rockwell and scleroscope. Of these three, the Brinell is perhaps the most commonly used. The present invention relates broadly to improvements in testing machines, and more particularly testing machines of the Brinell type, and to improvements in methods of testing in accordance therewith.

It is well recognized that the Brinell test determines hardness by deformations, but there are a great many factors entering into the testing and the same apparatus may be operated at different times or by different engineers on the same piece of material with different results. This is true even though the material is tested at different times under like conditions with respect to temperature and the like. While the variations between successive tests are small, it will be obvious that they involve an inaccuracy which it is highly desirable to overcome. The present invention has for one of its objects the provision of a testing apparatus and method of testing by deformation of such nature that successive tests under like conditions will give more nearly uniform readings, thereby enabling a more accurate measurement of hardness by deformation to be obtained.

In the accompanying drawings there is shown for purposes of illustration only a preferred embodiment of my invention, it being understood that the drawings do not define the limits of my invention, as changes in the construction and operation disclosed therein may be made without departing from the spirit of my invention or the scope of my broader claims.

Figure 2:
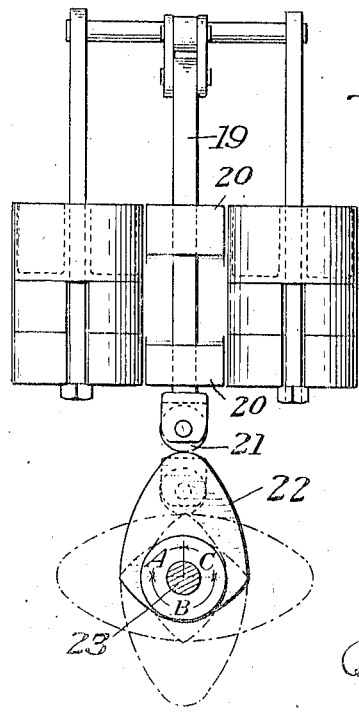

In the drawings:

Figure 1 is a side elevational view of a testing machine constructed in accordance with the present invention; and Figure 2 is a vertical sectional view on a line II—II of Figure 1 looking in the direction of the arrows.

In Brinell testing apparatus as constructed at the present time the possibility of error in the making of successive readings arises largely from the difference in speed of conducting the test or the difference in time utilized in successive tests in building up the desired operating pressure. For iron, steel and harder metals, 3000 kilograms is the standard pressure utilized, while for softer metals such as lead and babbitt a more moderate pressure is used. In all cases, however, this pressure has been gradually built up by the utilization of a pump or by the operation of a screw. If the pump or the screw are operated at a comparatively high speed, the inertia of the parts which must be moved plays an important part and a considerably deeper indentation is obtained under such conditions than under conditions in which a similar test is conducted more slowly. The present invention eliminates to a very large extent the human element and provides a method of such nature that successive tests may be made not only under like conditions with respect to factors heretofore taken into consideration, but under like conditions with respect to applied pressure and duration of the applied pressure. It will of course be apparent that in all cases the period during which the pressure is applied should be long enough to permit the parts to reach an equilibrium.

In the accompanying drawings there is disclosed a testing machine comprising a suitable frame 2 having a support 3 for the material to be tested, the support being vertically adjustable, as by means of a screw 4 and cooperating hand wheel 5.

Carried by the frame in opposition to the support 3 is a plunger 6 carrying at its lower end a material engaging member 7 of known characteristics. In accordance with standard conditions employed at the present time this member may be in the form of a ball, although a cone or other shape may be effectively utilized. The plunger 6 cooperates with knife edged bearings 8 on a lever 9. This lever preferably has a pivotal bearing of the knife edge type 10 by which it is supported from the frame 2. At its other end the lever 9 is connected to a second lever 11 through a link 12, and the lever 11 is similarly connected to a third lever 13 through a link 14. All of the connections between these parts may comprise knife edged bearings for the purpose of reducing friction and insuring greater accuracy. By reason of the system of levers disclosed herein it will be apparent that a comparatively large movement of the outer end of the lever 13 gives a comparatively small movement of the material engaging member, but at the same time increases the effectiveness of any load applied to the member 13.

In accordance with the present invention I preferably apply a load by providing projecting bearings 15 on the outer end of the lever 13 and suspending links 16 therefrom which links carry removable weights 17 at their lower ends. These weights may obviously be in the form of standard units whereby the removal of a certain number of weights or the addition of a predetermined number of weights will vary the applied pressure by predetermined amounts. In order to compensate accurately for any non-uniformity as to weight, or the like, each of the links 16 may carry a compensating cup 18 for the reception of lead shot in variable quantities.

With the construction of the character described, it will be obvious that upon releasing the outer end of the lever 13 the weights applied to the links will operate to impose a predetermined and definite pressure on the material engaging member 7. It is desirable, however, in order to insure uniformity of application of the pressure to prevent the sudden dropping of the lever 13 under such conditions that a blow is transmitted to the material. For uniformly releasing the weight for successive tests I may provide an operating pitman 19 pivotally connected to the outer end of the lever 13 and guided at its intermediate portions in bearings 20. At its lower end the pitman carries a roller 21 adapted to cooperate with a cam 22. This cam has an operating face which may be divided into three parts. Assuming rotation of the cam in the direction indicated by the arrow in Figure 2, the portion of the cam included by the angle A will be effective for gradually lowering the weights to permit them to pull the material engaging member into contact with the material with a slow definite movement. By the time the roller 21 reaches the end of the portion included by the angle A the member 7 will be in engagement with the material. During rotation of the cam through the next 180° the portion of the cam included by the angle B will be ineffective for exerting any sustaining influence on the pitman 19 and consequently the lever 13 and its associated parts. During this period therefore a constant and predetermined load or gravity pull will be exerted on the lever 13 and transmitted thereby to the material engaging member. By reason of this constant and predetermined applied pressure, successive tests under like conditions will give uniform readings of a character heretofore not obtainable. The speed of operation of the cam will obviously be such that during the travel thereof through the angle B sufficient time will be given to permit the material and material engaging member to come into equilibrium. Thereafter, the portion of the cam included by the angle C will be effective for gradually raising the weights and relieving the pressure.

The cam may be operated in any desired manner, but I have found advantageous results are obtained by mounting it on an axle 23 driven by a worm wheel 24. This worm wheel may in turn be driven by a worm 25 operated through a reducing gear train 26 from a motor 27. The gear reduction will preferably be such that although the motor may operate at a comparatively high speed, for example, 1800 R. P. M., the worm will operate at a comparatively low speed, for example, 150 R. P. M. Under such conditions the pitch of the worm and worm wheel would be such that the worm wheel and cam would be given one revolution for each 150 revolutions of the worm. This would provide an operating condition such that approximately 15 seconds would be devoted to lowering the weights, 30 seconds to the test period and 15 seconds to returning the parts to normal conditions. With such a gear reduction, a slight variation in the speed of the operating motor produces an almost negligible variation in the speed of operation of the cam. In any case, however, the contour of the cam portion embraced by the angle A is such as to insure a gradual lowering of the weights and application of the pressure so that variations in operating speed do not vary the accuracy of the results obtained. It will be found apparent to those skilled in the art that the times and speeds referred to herein are illustrative only, it being appreciated by me that the times and speeds may be varied within comparatively wide limits with different materials while maintaining accurate results.

The motor may be provided with a control of known characteristics such that at the conclusion of each revolution of the cam 22 the motor circuit will be stopped with the parts substantially in the position illustrated in Figure 2 ready for a succeeding test.

Certain advantages of the present invention arise from the provision of a testing machine operable for determining hardness by deformation in which the testing pressure is obtained through gravity by means of weights gradually moved into operative position.

Other advantages of the invention arise from a method of testing hardness of materials by deformation under such conditions that successive tests give uniform results.

I claim:

1. In the method of testing the hardness of materials by deformation, the steps comprising providing a material engaging member, gradually producing a predetermined definite relative movement between said member and the material to be treated to bring the same together, exerting a predetermined and constant gravity pull on said member to cause it to penetrate the material being tested an amount determined by the hardness of such material, and then returning said member to its original position.

2. In the method of testing the hardness of materials by deformation, the steps comprising providing a material engaging member, producing gradual relative movement between such member and the material to be tested to bring the same into engagement, exerting a predetermined and constant pressure by gravity on said member throughout a fixed period to cause it to penetrate the material being tested an amount variable with its hardness, and then returning said member to its original position.

3. In the method of testing the hardness of materials, the steps comprising providing a weight controlled material engaging member, and gradually increasing the effectiveness of the weight on said member at a predetermined definite rate until the weight becomes constant, maintaining the weight constant until the parts come into equilibrium, and then returning the weight to its original position.

4. In the method of testing the hardness of materials, the steps comprising providing a weight controlled material engaging member, and gradually increasing the effectiveness of the weight on said member at a predetermined definite rate until the weight becomes constant, maintaining the weight constant for a fixed period, and then returning the weight to its original position.

5. In the method of testing the hardness of materials, the steps comprising providing a weight controlled material deforming member, and gradually increasing the effectiveness of the weight on said member at a predetermined definite rate until equilibrium between the member and material being tested is reached whereby the deformation of said member is determined entirely by the effect of gravity on said weight.

6. In a testing apparatus, a material engaging member, a weight of a fixed value for effecting movement of said member, and means operable at a predetermined speed only for gradually releasing said weight and thereafter raising the same in timed relation for definitely controlling the actual testing period.

7. In a testing apparatus, a material engaging member, a weight of a fixed value for effecting movement of said member, and cam means operable at a predetermined speed only for gradually releasing said weight.

8. In a testing apparatus, a material engaging member, a weight, a system of levers intermediate said weight and member whereby the effect of said weight on said member is increased, and means for gradually increasing the effect of said weight on said member and definitely limiting the actual testing period.

9. In a testing apparatus, a material engaging member, a weight, a system of levers intermediate said weight and member whereby the effect of said weight on said member is increased, cam means for gradually increasing the effect of said weight on said member, and means for operating the cam at a predetermined definite rate.

10. In a testing machine, a material engaging and deforming member, a weight of fixed characteristics operable on said member, and motor operated means normally holding said weight in inoperative position, said means being operative for controlling both the descent and elevation of said weight throughout the entire distance of movement thereof.

11. In a testing machine, a material engaging and deforming member, a weight of fixed characteristics operable on said member, and motor operated cam means normally holding said weight in inoperative position, said means being operative for controlling both the descent and elevation of said weight throughout the entire distance of movement thereof.

In testimony whereof I have hereunto set my hand.

HOWARD M. GERMAN.